(12) United States Patent
Zhou et al.

(10) Patent No.: US 7,219,102 B2
(45) Date of Patent: May 15, 2007

(54) METHOD, COMPUTER PROGRAM PRODUCT, AND SYSTEM CONVERTING RELATIONAL DATA INTO HIERARCHICAL DATA STRUCTURE BASED UPON TAGGING TREES

(75) Inventors: Nianjun Zhou, Somers, NY (US); George Andrei Mihaila, Yorktown Heights, NY (US); Dikran S. Meliksetian, Danbury, CT (US); Sriram Padmanabhan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 471 days.

(21) Appl. No.: 10/788,141

(22) Filed: Feb. 26, 2004

(65) Prior Publication Data

US 2005/0138052 A1     Jun. 23, 2005

Related U.S. Application Data

(63) Continuation-in-part of application No. 10/744,424, filed on Dec. 22, 2003.

(51) Int. Cl.
G06F 17/00     (2006.01)
G06F 17/30     (2006.01)
(52) U.S. Cl. .......................................... 707/101; 707/3
(58) Field of Classification Search .................... 707/3, 707/100, 101
See application file for complete search history.

(56) References Cited

U.S. PATENT DOCUMENTS 6,785,673 B1 *   8/2004   Fernandez et al. ............. 707/3
7,051,033 B2 *   5/2006   Agarwal et al. ............. 707/100
2002/0087571 A1 *   7/2002   Stapel et al. ................. 707/100
2002/0116371 A1 *   8/2002   Dodds et al. .................. 707/3
2005/0055336 A1 *   3/2005   Hui et al. ...................... 707/3

OTHER PUBLICATIONS

Shanmugasundaram, Jayavel, et al., "Efficiently Publishing Relational Data as XML Documents," Proceedings of the 26th Inetrnational Conference on Very Large Databases, Cairo, Egypt, 2000.

Shanmugasundaram, Jayavel, et al., "Querying XML Views of Relational Data," Proceedings of the 27th VLDB Conference, Roma, Italy, 2001.

* cited by examiner

*Primary Examiner*—Alford Kindred
*Assistant Examiner*—Hung Tran Vy
(74) *Attorney, Agent, or Firm*—John E. Campbell; Jeffrey N. Giunta; Fleit, Kain, Gibbons, Gutman, Bongini & Bianco P.L.

(57) ABSTRACT

Tagging trees are generated and used to facilitate transforming data from relational databases into hierarchical formats, such as in XML documents. Tagging trees contain both XML hierarchical structure information as well a query information that is needed to access different data sources, e.g., databases, to retrieve the information to be placed in the hierarchical structure. A designer optionally creates a mapping script that specifies the transformation from relational databases to the hierarchical format. A tagging tree is created by either parsing that mapping script or by other means. A runtime environment then processes the tagging tree by a depth first traversal. The runtime environment is able to be configured to output a hierarchical data object, such as an XML document, or pipelined to control, for example, SAX processing.

20 Claims, 10 Drawing Sheets

```
        <!DOCTYPE polist [                /―312
302 ―― <!ELEMENT polist (po* ::r:=d.sql("SELECT ID, BUYER, SELLER FROM PO")>
304 ―― <!ELEMENT po (id, buyer, seller, (lineitem)* :: w:=d.sql("SELECT NAME, PRICE
                                  /―316                 FROM LINEITEM
                                                        WHERE POID =$r.ID"))>
      ―<!ELEMENT id (#PCDATA :r.ID )>
306    <!ELEMENT buyer (#PCDATA :r.BUYER) >                              ―314
       <!ELEMENT seller (#PCDATA :r.SELLER) >
307 ――<!ELEMENT lineitem (name, price) >
308 ――<!ELEMENT name (#PCDATA :w.NAME )>
310 ――<!ELEMENT price (#PCDATA :w.PRICE )>
       ]>
```

```
1   <?xml version="1.0"?>
2   <xrt:xrt xmlns:xrt="http://www.xrt.org" xmlns:xsl="http://www.w3.org/1999/XSL/Transform" version="1.0">
3     <xrt:rdbms2xml>
4       <xrt:locator xrt:name="d"/>
5       <xrt:sqlsearch xrt:qid="q1">
6         <xrt:query>select POID, BUYER, SELLER from po</xrt:query>
7       </xrt:sqlsearch>
8       <xrt:sqlsearch xrt:qid="q2">
9         <xrt:query>select NAME, PRICE from lineitem where POID=?</xrt:query>
10        <xrt:with-parameter xrt:position="1" xrt:scopetype="record" xrt:scopeqid="q1" xrt:type="integer" xrt:select="$poid"/>
11      </xrt:sqlsearch>
12    </xrt:rdbms2xml>
13    <xrt:xml2xml>
14      <xsl:stylesheet version="1.0" xmlns:xrt="http://www.xrt.org" xmlns:xsl="http://www.w3.org/1999/XSL/Transform">
15        <xsl:template match="store2xml">
16          <xsl:element name="polist">
17            <xsl:apply-templates select="q1" />
18          </xsl:element>
19        </xsl:template>
20        <xsl:template match="q1">
21          <xsl:element name="po">
22            <xsl:element name="id"><xsl:value-of select="POID/@value"/></xsl:element>
23            <xsl:element name="buyer"><xsl:value-of select="BUYER/@value"/></xsl:element>
24            <xsl:element name="seller"><xsl:value-of select="SELLER/@value"/></xsl:element>
25            <xsl:apply-templates select="q2"/>
26          </xsl:element>
27        </xsl:template>
28        <xsl:template match="q2">
29          >xsl:element name="lineitem">
30            <xsl:element name="name"><xsl:value-of select="NAME/@value"/></xsl:element>
31            <xsl:element name="price"><xsl:value-of select="PRICE/@value"/></xsl:element>
32          </xsl:element>
33        </xsl:template>
34      </xsl:stylesheet>
35    </xrt:xml2xml>
36  </xrt:xrt>
```

```
1   <?xml version="1.0"?>
2   <store2xml>
3           <q1>
4                       <POID value="100"></POID>
5                       <BUYER value="Compaq"></BUYER>
6                       <SELLER value="Intel"></SELLER>
7                       <q2>
8                                   <NAME value="chip 1"></NAME>
9                                   <PRICE value="40"></PRICE>
10                      </q2>
11                      <q2>
12                                  <NAME value="chip 2"></NAME>
13                                  <PRICE value="90"></PRICE>
14                      </q2>
15  </store2xml>
```

```
702
   procedure traverse (node n)
   switch (n.type)
       case Element: output "<" + n.name + ""
               for each attribute node a child of n
                   traverse(a)
               end for
   704     output ">"
               for each child n' of n
                   traverse(n')
               end for
               output "</" + n.name + ">"
       case Attribute: output a.name + "="
               if n is a static data node
                   output n. value
   706         else /* dynamic */
                   output
                       value(n.binding.exec_node.current_row,
                           n.binding.column_inded)
               end if
       case Text: if n is a static data node
                   output n.value
               else
   708             output
                       value(n.binding.exec_node.current_row,
                           n.binding.column_index)
               end if
       case Choice: child_name=
                   value(n.binding.exec_node.current_row,
   710             n.binding.column_index)
               let n' be the child of n with name child_name
               traverse(n')
       case Execution: result_set = execute(n.sql)
               for each row r in result_set
                   n.current_row = r
   712             for each child n' of n
                       traverse(n')
                   end for
               end for
   end switch
   end procedure
```

METHOD, COMPUTER PROGRAM PRODUCT, AND SYSTEM CONVERTING RELATIONAL DATA INTO HIERARCHICAL DATA STRUCTURE BASED UPON TAGGING TREES

RELATED APPLICATIONS

This application is a continuation-in-part of commonly owned U.S. Patent Application entitled "Method, Computer Program Product, And System Of Optimized Data Translation From Relational Data Storage To Hierarchical Structure", U.S. patent Ser. No. 10/744,424, filed on Dec. 22, 2003 and is now [pending], which is hereby incorporated by reference in its entirety.

BACKGROUND OF THE INVENTION

1. Field of the Invention

This invention relates to database query techniques and more specifically to producing hierarchical structures containing data obtained from relational databases.

2. Background of the Invention

Data sets are frequently communicated or delivered in hierarchical data structures. Such hierarchical data structures can be stored in structured documents, such as extensible Markup Language (XML) documents. XML documents, for example, are widely accepted by various processing programs and data exchange systems, wherein the data in the XML document is used directly or transformed into a data structure used by the receiving program or system.

In contrast to the communications and delivery of data, database systems are generally used to store and manipulate data. Relational database systems are a popular type of database system due to the many widely known benefits to storing and manipulating data stored in relational databases. Relational databases are generally maintained by software systems that are referred to as Relational Database Management Systems (RDBMS). RDBMSs are generally able to be distributed among two or more computer nodes that are able to be physically and even geographically separated. An enterprise is also able to distribute data among multiple RDBMSs that are hosted on different computers and retrieval of a complete set of data for a particular request in such enterprises then requires access to the multiple RDBMSs.

A common data manipulation process is the publishing of data out of a database in an XML format. Specifying the processing for retrieving data from a relational database and delivering that data in a hierarchical structure format, such as in an XML document, is frequently a time consuming and error prone process. Such operations typically begin with a definition of the hierarchical data structure to be produced, and an identification of data to be retrieved from one or more RDBMSs is then associated with each node of that hierarchical data structure definition. An often complex and not easily reusable application program or script is then typically developed to directly perform this transformation.

In order to allow more efficient definition of retrieval and publication of data from relational databases into a hierarchical data structure, a more efficient way to specify data retrieval from structured databases and subsequent mapping of the data retrieved into hierarchical data structures from data contained in relational databases is needed.

SUMMARY OF THE INVENTION

Briefly, in accordance with the present invention, a method for defining data transfer from a database into a hierarchical structure includes generating a tagging tree that corresponds to a mapping between a relational database and a hierarchical data structure. The tagging tree comprising a plurality of nodes and each of the plurality of nodes has a node type. Node types are one of execution node, data node, binding node, attribute node, and element node. The method further includes traversing at least one node of the tagging tree and retrieving, in response to traversing an execution node, a data object from the at least one relational database as specified in the execution node. The method further includes inserting, in response to a data node and based upon the mapping, the data object into an output conforming to the hierarchical structure.

In accordance with another aspect of the present invention, a data transformation processor includes a tagging tree generator that generates a tagging tree that corresponds to a mapping between a relational database and a hierarchical data structure. The tagging tree has a plurality of nodes and each of the plurality of nodes has a node type. Node types are one of execution node, data node, binding node, attribute node, and element node. The data transformation processor further has a runtime environment that traverses at least one node of the tagging tree and retrieves, in response to traversing an execution node, a data object from the at least one relational database as specified in the execution node. The runtime environment further inserts, in response to a data node and based upon the mapping, the data object into an output conforming to the hierarchical structure.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

FIG. 4A illustrates an exemplary external XRT mapping script, in accordance with an exemplary embodiment of the present invention.

DETAILED DESCRIPTION OF THE EMBODIMENTS

The exemplary embodiments of the present invention provide a method and system for transforming flat relational data to XML (extensible Markup Language) hierarchal data by using a depth-first tree traversal of a tagging tree. This transformation is defined at the structure level rather than the instance level, and is represented as tagging tree. One or more XML DTD (Document Type Definition) or XML Schema defines the structure of XML data objects. Database schemas define the structure of the relational data.

The present invention contains subject matter which is related to co-pending patent application Ser. No. 10/614,664 filed Jul. 7, 2003 entitled "UNIVERSAL FORMAT TRANSFORMATION BETWEEN RELATIONAL DATABASE MANAGEMENT SYSTEMS AND EXTENSIBLE MARKUP LANGUAGE USING XML RELATIONAL TRANSFORMATION" and commonly assigned herewith and hereby incorporated by reference in its entirety.

The exemplary embodiments of the present invention are able to be advantageously applied to tasks in data management, business-to-business message exchange, and content management. An especially advantageous application is the transformation of relational data to specific XML dialects such as HTML (Hypertext Markup Language), VXML (Voice XML) and WML (Wireless Markup Language), in order to support various display devices.

SUMMARY OF THE INVENTION

The challenges of the transformation are: 1) How to map from multiple flat data structures to one hierarchical XML data structure? 2) How to access the data located in different tables or even different databases? 3) How to connect the retrieved data together to create an instance of XML binding the pre-defined hierarchical structure.

The methodology described in this disclosure completes the transformation in two steps: The first part is a static portion. A mapping from the relational structure to a hierarchical structure defined by XML Schema or DTD is created. For this purpose, the concept of tagging tree is defined. Various types of nodes and edges compose a tagging tree. The tagging tree is created by parsing external scripts using different notations, or constructed manually by invoking different node creation methods. Second, we use the depth-first tree traversal algorithm to walk through the tagging tree with inputs from end-user or other program to generate a specific instance of XML by retrieving data from relational data system. The runtime execution itself has two steps: 1) Information from the database is retrieved using the SQL queries in the execution nodes, thereby creating an array of intermediate data sets; and 2) The data from the intermediate data sets is transformed into the required final output XML format using format specified by the tagging tree.

Exemplary System Overview

Figure 1:
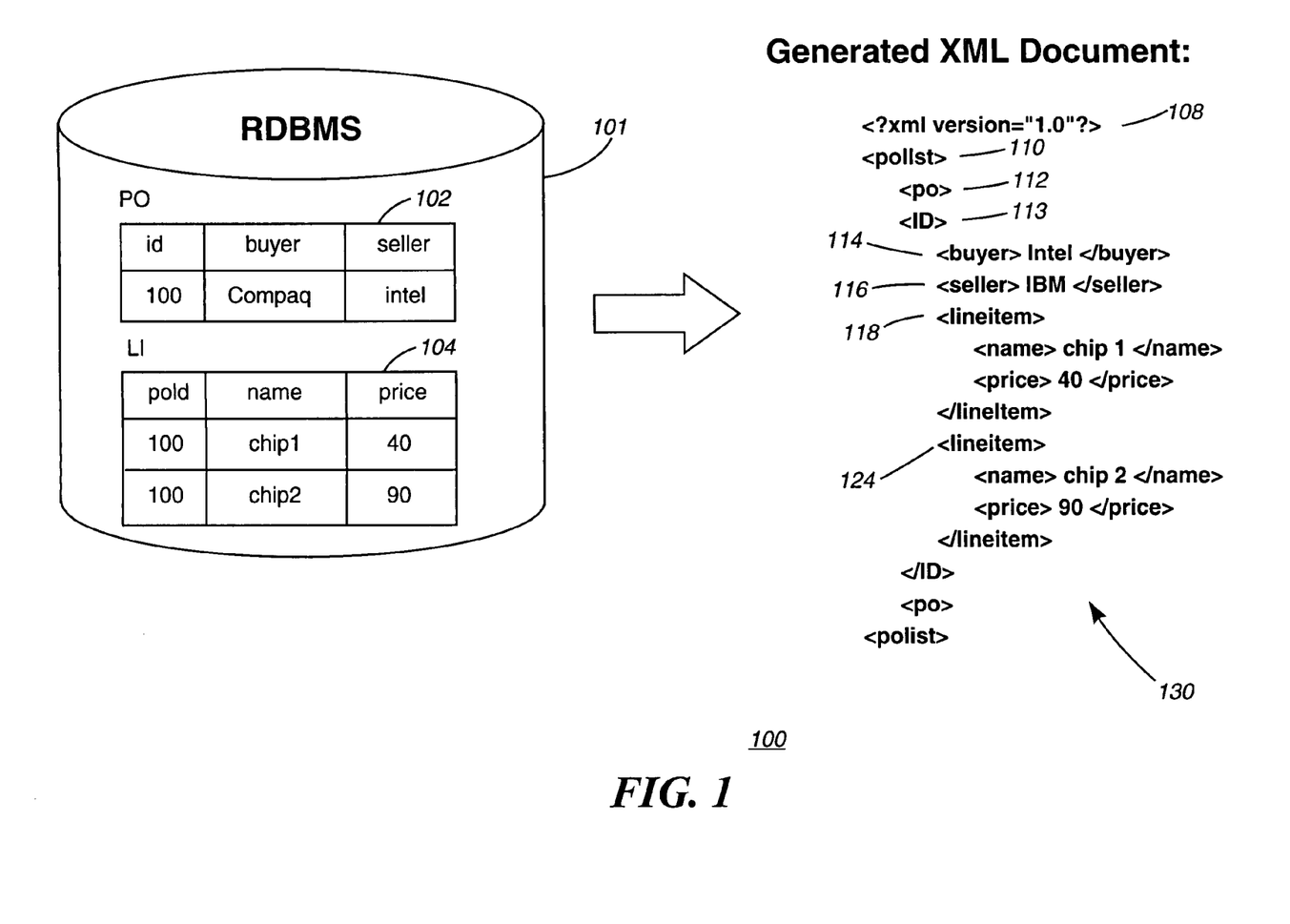
FIG. 1 is an exemplary data transformation diagram according to an exemplary embodiment of the present invention.

A data transformation 100 diagram, including an exemplary RDBMS set of tables and a resulting published XML document generated by an exemplary embodiment of the present invention, is illustrated in FIG. 1. The RDBMS 101 in this example contains a number of tables. Illustrated in the RDBMS 101 in this example are two tables that contain a description of one purchase order. These two trivially simple tables are illustrated here for ease of understanding of the publishing process. The exemplary embodiment operates with one or more RDBMSs that maintain complex database tables. These two tables could also be visualized as results sets that would be produced by conventional processing, which would execute the two exemplary queries 800 in series to produce these result sets from a more populated set of database tables.

The "PO" table 102 in this illustration is shown to contain one row that contains a description of a purchase order that is stored in the RDBMS 101. This purchase order has an ID element containing "100," which is an identification number used only by the RDBMS 101 to identify this purchase order and related elements in the same or other tables maintained by this RDMBS 101. This purchase order also has a buyer element containing "Compaq" and a seller element containing "Intel." An "LI" result set 104 contains two rows that correspond to the "poid" of "100," as was identified in the "PO" result set 102. The name and price for the items on this purchase order is similarly contained in a second and third row of the "LI" table 104.

The data in the RDBMS 101 is published to a generated XML document 130 as illustrated. A first tag 108 identifies the XML version in use by this document. A root tag 110 specifies the root name for this structured document. Within the "polist" section of this document is a subsection with a "po" tag 112. The "id" element 113, "buyer" element 114 and "seller" element 116 correspond to data contained in the "PO" table 102.

The exemplary XML document contains two "lineitem" sections that begin with a first "lineitem" tag 118 and a second "lineitem" tag 124. All tags in this XML document have corresponding closing tags as is known to ordinary practitioners in the relevant arts.

Figure 2:
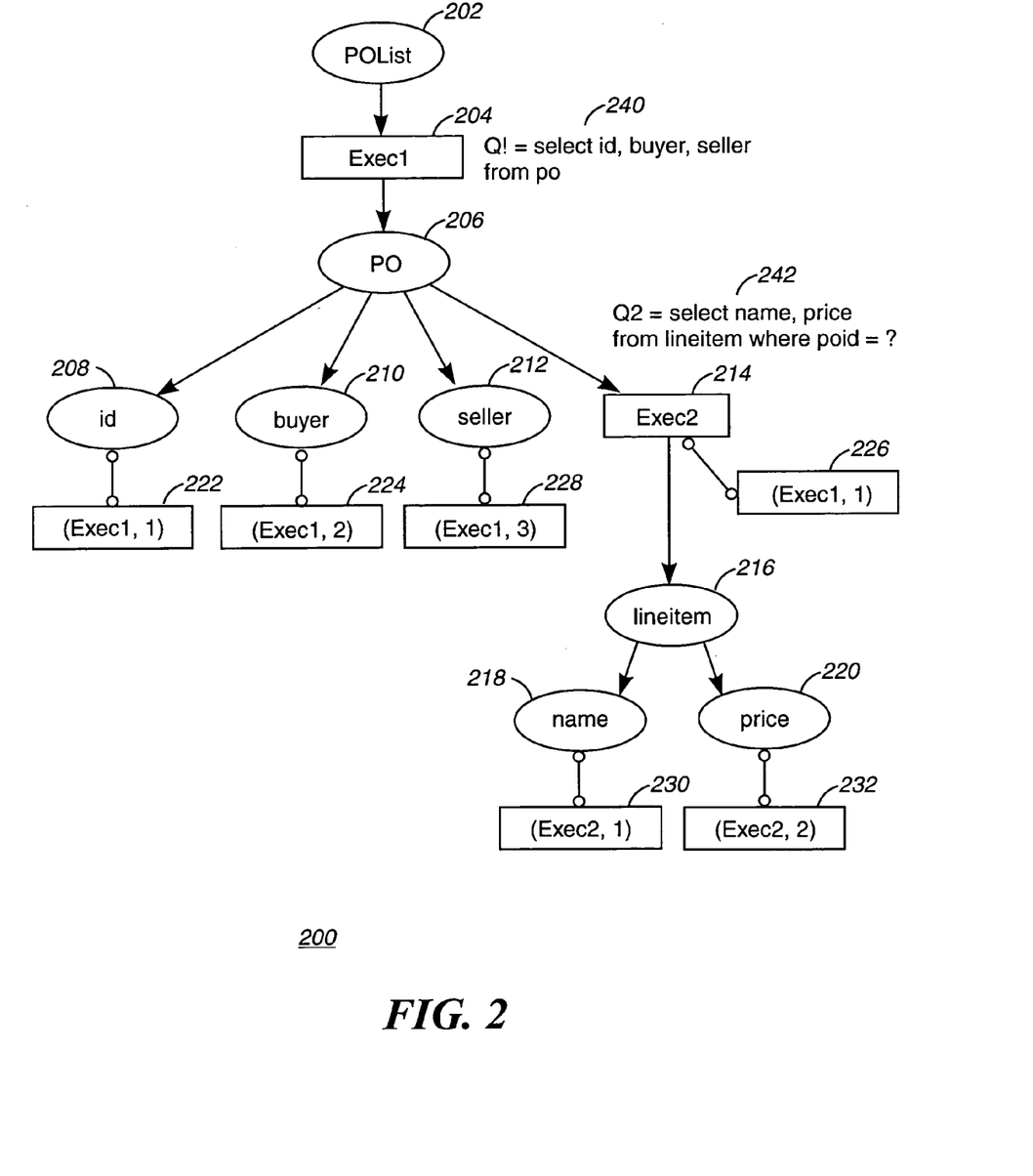
FIG. 2 illustrates an exemplary tagging tree according to an exemplary embodiment of the present invention.

An exemplary tagging tree 200 as is generated by an exemplary embodiment of the present invention, is illustrated in FIG. 2. Tagging trees as are used by the exemplary embodiments of the present invention have nodes that can be one of multiple node types that have been defined for a tagging tree by the particular embodiment. The various node types define the features of the transformation from a relational database to the hierarchical data structure of the XML output document.

Two of the node types that are defined for a tagging tree of the exemplary embodiment are sub-types of data nodes. Data nodes are used to represent the data from relational database. The two possible data nodes are attribute node and text node. Data nodes publish the data extracted from the relational database into an XML output document.

An attribute node represents an attribute of XML. Thus, an attribute data node will publish its data as an XML attribute (inside an XML start tag). Attribute nodes contain an attribute name. The data held by an attribute node is able to be static or dynamic. Dynamic data has a binding node attached to the data node to connect the specified attribute value with a specific query defined by an execution node to which the binding is also attached.

A text node is similar to an attribute node, except that the data held by the text node is used for an XML text node. Thus, a text data node will publish the data as text (outside of XML tags).

A binding node is a special type of node that specifies a relationship between the data of a data node and an execution node (defined later). For a binding node, a column number of a dataset produced by an execution node is used to specify the data extracted by the binding node from the result set of the query specified by the execution node.

A choice node is associated with a binding node and multiple children nodes. When being processed by a runtime algorithm of the exemplary embodiment, the value of the associated binding node determines the next node to be visited, i.e., which one of the children nodes is to be visited, during tagging tree traversal.

Element nodes contain an element name and have as children one data node, zero or more attribute nodes and zero or more element nodes.

Execution nodes contain a parameterized SQL command. The output of the execution of the contained parameterized SQL command is a resulting dataset. These datasets are a set of tuples. Each tuple contains multiple columns. Descendent nodes of the execution node are able to use the data of the dataset produced by the SQL command of that execution node. If a descendant node uses data within the dataset, a binding node specifies that usage in the exemplary embodiment.

The exemplary tagging tree 200 is identified as "POList" by the root node 202. The root node 202 is also an element node that specifies the top level tag to be provided in the output hierarchical data. The next node is an "Exec1" node 204, which is an execution node that has a first parameterized SQL SELECT command 240 as shown. The "Exec1" node 204 and the corresponding Q1 query 240 correspond to the "PO" table 102 described above. The first parameterized SQL SELECT command 240 selects the "ID," "buyer," and "seller" columns from the table "po." The "PO" node 206 is an element node that identifies the tag to be used for the descendant leaves in that branch of the output hierarchical data structure tree. The "PO" element node 206 corresponds to the "po" tag 112, described above. The "ID" node 208 is an element node that specifies a tag "ID," which is descendant to the tag "PO," to be provided for associated data in the output hierarchical data structure. The "(Exec1, 1)" node 222 is a data node that specifies that the data contained in the first column, as indicated by the "1" in the second parameter, of the result set returned by the query specified by the "Exec1" execution node 204 is to be inserted under the "ID" tag. The "buyer" node 210 and the "seller" node 212 are element nodes that similarly identify hierarchical tags to be provided in the output hierarchical data structure for the data specified by the "(Exec1, 2)" data node 224 and the "(Exec1, 3)" data node 228, respectively. The "(Exec1, 2)" data nodes 224 specifies that the data contained in the second column of the result set returned by the query specified in the "Exec1" execution node 204 is to be provide under the associated "buyer" tag 210 in the output hierarchical data structure. The "(Exec1, 3)" data node 228 specifies that the data contained in the third column, as indicated by the "3" in the second parameter, of the result set returned by the query specified in the "Exec1" execution node 204 is to be provided under the associated "seller" tag 212 in the output hierarchical data structure.

The "Exec2" node 214 is an execution node that specifies a second database query that is defined by the second parameterized SQL SELECT command 242 as is shown. The "lineitem" result set of the second query 242 corresponds to the "LI result set 104, described above. The position of the Exec2 node 214 under the PO node 206 indicates that data from the "Exec2" node 214 is to be inserted into nodes that are children of the "PO" tag in the output hierarchical data structure. The "Exec2" node 214 is associated with a second "(Exec1, 1)" node 226 that specifies that the data in the first column of the result set produced by the "Exec1" execution node is to be used in the SQL WHERE clause of the SELECT command specified in the "Exec2" execution node 214. This indicates that the data to be retrieved by the "Exec2" execution node 214 is dependent upon the data retrieved by the "Exec1" execution node 204. The data result set produced by the "Exec2" command node 214 is shown as connected to the "lineitem" element node 216, which indicates that the data produced by the "Exec2" execution node 214 is to be placed under a "lineitem" tag in the output hierarchical data structure. The "lineitem" tags correspond to the "lineitem" element node 216 of the exemplary tagging tree correspond to the first "lineitem" tag 118 and the second lineitem tag 124, described above. Lineitem tags are replicated in the exemplary embodiment for each iteration of a "lineitem" record retrieved from the target database.

The tagging tree 200 shows two element nodes, a "name" node 218 and a "price" node 220, that are descendants to the "lineitem" element node 216. The "name" node 218 is shown as associated with an "(Exec2, 1)" node 230, which indicates that the first column of the result set produced by the "Exec2" execution node 214 is to be provided under a "name" tag in the output hierarchical data structure. The "price" node 218 is similarly shown as associated with an "(Exec2, 2)" node 232, which indicates that the second column of the result set produced by the "Exec2" execution node 214 is to be provided under a "price" tag in the output hierarchical data structure.

Figure 3:
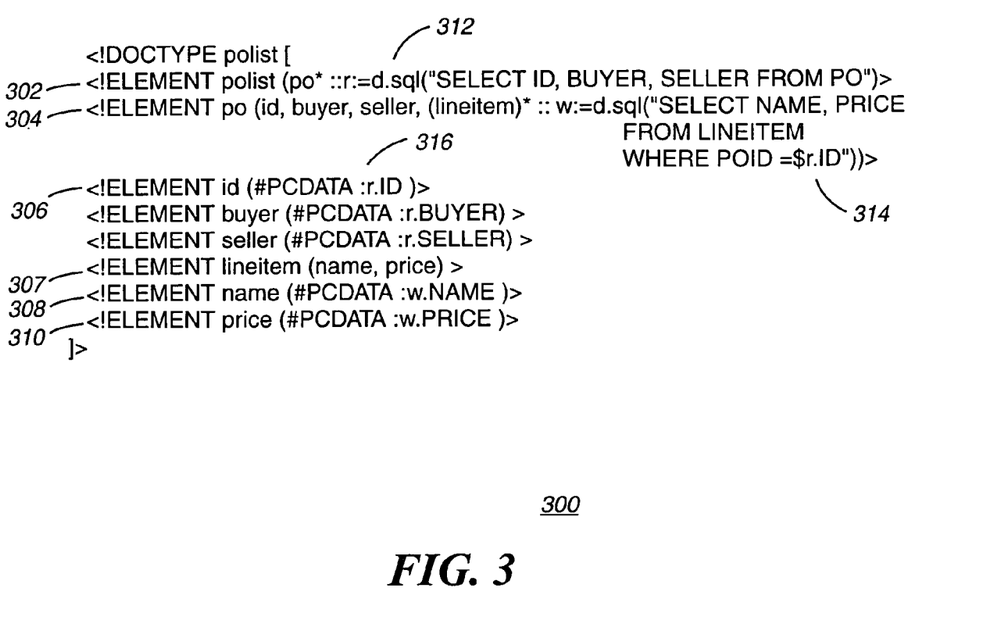
FIG. 3 illustrates an exemplary DTDSA script according to an exemplary embodiment of the present invention.

An exemplary DTDSA script 300 as is processed by an exemplary embodiment of the present invention is illustrated in FIG. 3. The exemplary DTDSA script 300 illustrates several constructors used in external mapping scripts that are processed by the exemplary embodiment of the present invention. The exemplary DTDSA script 300 conforms to the Data Type Document with Source Annotation format.

A first construction used in DTDSA scripts is the use of repetition symbols, which are the "*" character in this example. For every element for which there is a repetition symbol "*" in a DTDSA script, a variable is introduced. The variable introduced for the repetition symbol is then bound to an SQL command. These SQL commands are represented by an sql( ) annotation. This is referred to herein as a binding annotation. A first element declaration 302, for example, includes an annotation for element "po" that introduces a variable "r." This annotation also binds the variable "r" to a first SQL command 312. The first SQL command 312 specifies the SQL command "SELECT ID, BUYER, SELLER FROM PO" and retrieves all of the rows in the PO table.

In the exemplary embodiment, any SQL command is able to refer to values obtained from a variable that has been previously defined. For example, a second SQL command 304 includes a binding 314 to variable "w" that refers to the value of variable "r." This binding annotation results in the repeating of the element that is annotated for as many times as there are rows in the result produced by the first SQL command 302.

Another construction used in DTDSA scripts is the use of is the "#PCDATA" element. Each "#PCDATA" element has a specification of an annotation of the form "variable.column." This is referred to as a "value annotation" in this specification. In a value annotation, the "variable" was previously bound to an SQL command, and the "column" belongs to the result of that command. The meaning of this value annotation term causes the annotated element to receive its value from the specified "column" of the result of the SQL command that was bound to the specified "variable."

For example, a third element declaration 306 for the element "id" has a first value annotation 316 reads "r.ID[.]" This results in the element "id" receiving its value from the "ID" column produced by the SQL query bound to the "r" variable, i.e., the SQL query specified in the first element declaration 302 in this example.

The "lineitem" element declaration 307 specifies that the element "lineitem" has two sub-elements, namely "name" and "price". This element declaration does not have any annotations which results in a static content being generated for a "lineitem" element. In this example, the "lineitem element has exactly two children elements, "name" and "price." These two children elements do, however, have dynamic content.

The "name" element declaration 308 has a value annotation that reads "w.NAME". This results in the element "name" receiving its value from the NAME column produced by the SQL query bound to the "w" variable.

Embodiments of the present invention further allow different scripting languages to be used to specify external mapping scripts that define a mapping of data between at least one relational database table and a hierarchical data structure. An exemplary XML to Relational Transformation (XRT) language external mapping script 400 for the mapping described in the exemplary DTDSA script 300 is illustrated in FIG. 4A.

Figure 4B:
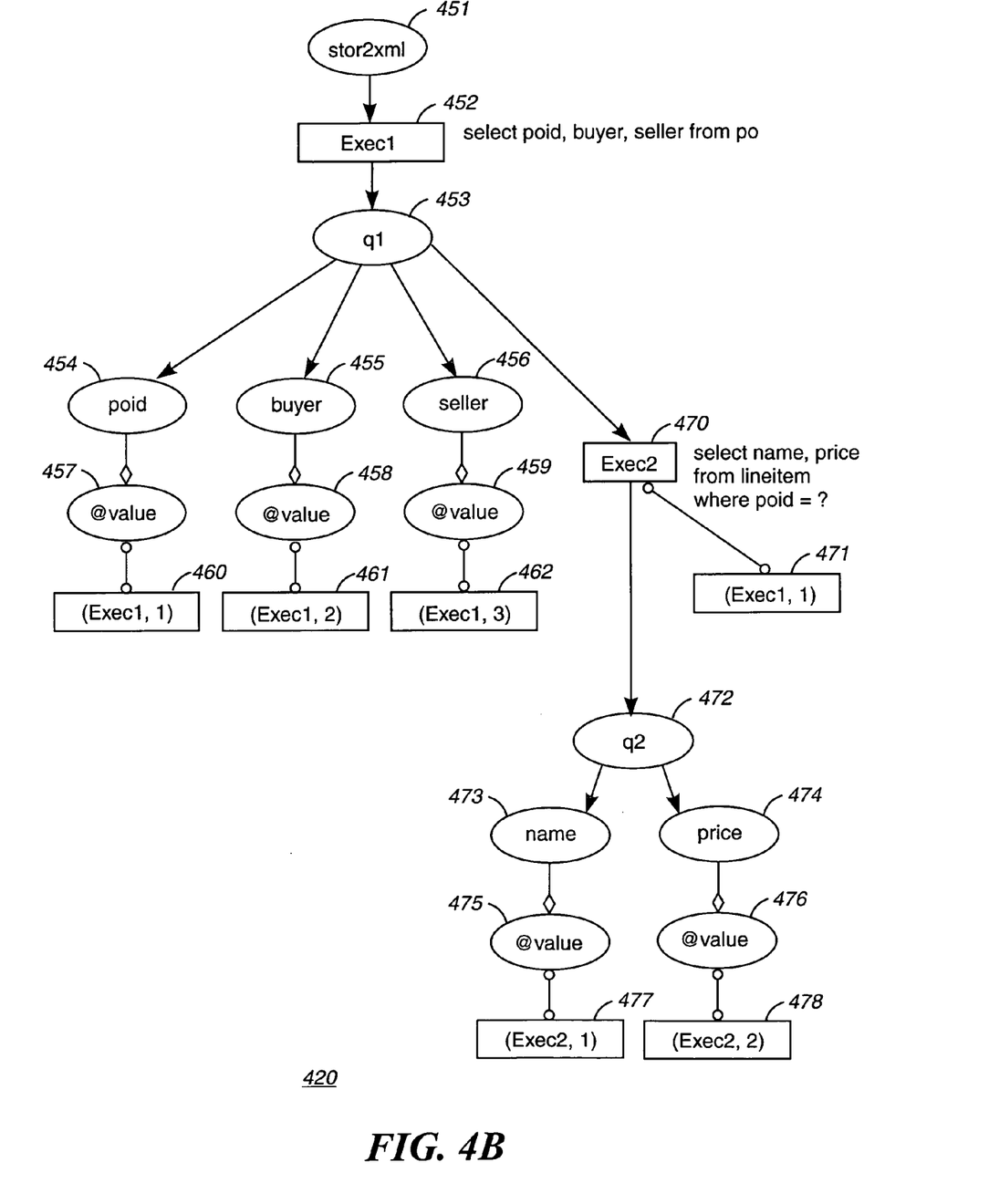
FIG. 4B illustrates an exemplary tagging tree as produced by the exemplary external XRT mapping script illustrated in FIG. 4A, in accordance with an exemplary embodiment of the present invention.

This exemplary external XRT mapping script 400 is composed of 2 parts. A first part consists of lines 3 to 12 and specifies data to be retrieved from the RDBMS and used to generate an exemplary tagging tree, which is described below in FIG. 4B. A second part of the exemplary external XRT mapping script 400 consists of lines 14 to 36 and specifies an XSL transformation, to be performed upon the intermediate output produced by the execution of the tagging tree (which is described below and shown in FIG. 4C) to produce the final XML 130.

An exemplary tagging tree 420, as produced by processing the exemplary external XRT mapping script 400 with an XML processor, is illustrated in FIG. 4B. This exemplary tagging tree is created as lines 3 to 12 are read and parsed by an XML processor when processing the exemplary external XRT mapping script 400. The root node 451 of the tagging tree is generically defined to be "store2xml," corresponding to line 3 of the exemplary external XRT mapping script 400. Line 4 is a reference to an externally defined RDBMS locator that is to be used by the execution nodes to access the specified RDBMS. Execution of line 5 generates the "Exec1" execution node 452, and its child, "q1" node 453. The "q1" tag node 453 corresponds to the value of the "qid" attribute of the "Exec1" node 452. The database query associated with the "Exec1" execution node 452 is specified on line 6 of the exemplary external XRT mapping script 400. When processing line 6, the parser creates element nodes of "poid" node 454, "buyer" node 455 and "seller" node 456 that correspond to the columns in the select clause of the associated query. For each such node, the processor also creates an attribute nodes of a first "@value" node 457, a second "@value" node 458, and a third "@value" node 459. These attribute nodes are generically called "value". Each of those attributes is bound to the execution node 452 through a binding node, which is one of the "Exec(1,1)" node 460, the "Exec(1,2)" node 461, and the "Exec(1,3) node 462. These binding nodes specify the position in the query results that corresponds to the attribute.

The XML processor of this exemplary embodiment parses the next "xrt:sqlsearch" element on line 8 of the exemplary external XRT mapping script 400. Processing line 8 creates the corresponding "Exec2" execution node 470 and the "q2" element node 472 that is tagged with the "qid" value of the "xrt:sqlsearch" element. Line 9 specifies the query corresponding to the "Exec2" execution node 470. Line 10 specifies a relationship between the "Exec2" execution node 470 and the previous execution node, the "Exec1" node 452. Line 10 specifies that the "poid" variable in the database query associated with the "Exec2" node 470 takes the values corresponding to the values of the "poid" column retrieved by the execution of the data base query associated with the "Exec1" node 452. This relationship is represented in the tagging tree by the "Exec(1,1) binding node 471, that specifies that the "Exec2" node 470 is bound to the "Exec1" execution node 452 through the value of the element of the $1^{st}$ column of the results produced by execution of the database query associated with the "Exec1" node 452. The processor then parses the query specified on line 9 and creates element nodes "name" node 473 and "price" node 474 that correspond to the columns in the query results produced by the database query associated with the "Exec2" node 470. Parsing line 9 further creates the attribute nodes of the fourth "@value" node 475, and the fifth "@value" node 476. These attribute nodes are bound with the corresponding values retrieved by the execution of the query, as specified by the "Exec(2,1)" node 477 and the "Exec(2,2) node 478.

Figure 4C:
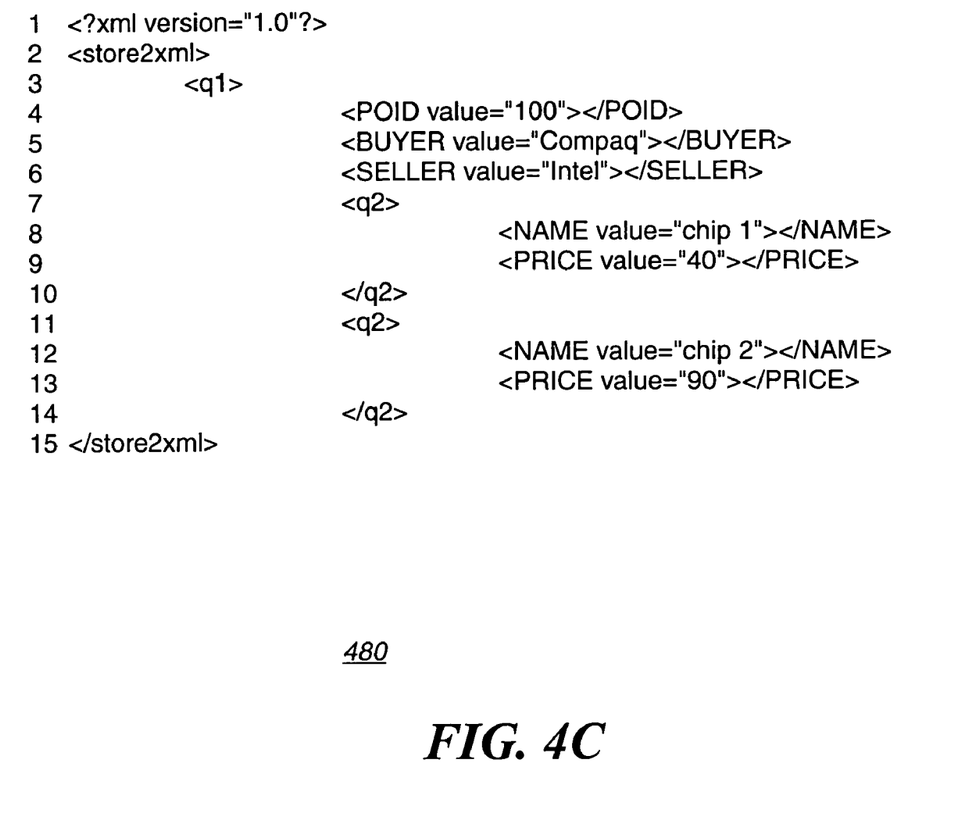
FIG. 4C illustrates an exemplary intermediate XML file produced by execution of the exemplary tagging tree illustrated in FIG. 4B, in accordance with an exemplary embodiment of the present invention.

An exemplary intermediate XML file 480 produced by execution of the exemplary tagging tree 420 is illustrated in FIG. 4C. The generation of such an XML file is described in detail below. After the intermediate XML file 480 is produced, the XSL transformation specified in lines 14 to 36 of the exemplary external XRT mapping script 400 is invoked to create the generated XML document 130, Techniques used to apply this XSL transformation to the intermediate XML output file 480 to produce the generated XML document 130 are readily known to ordinary practitioners in the relevant arts. In a preferred embodiment of the present invention, the intermediate XML file 480 is not actually created in this form, but rather it is conceptually represented by a sequence of SAX events and the two processes of executing the tagging tree and performing the XSL transformation are chained dynamically.

Figure 5:
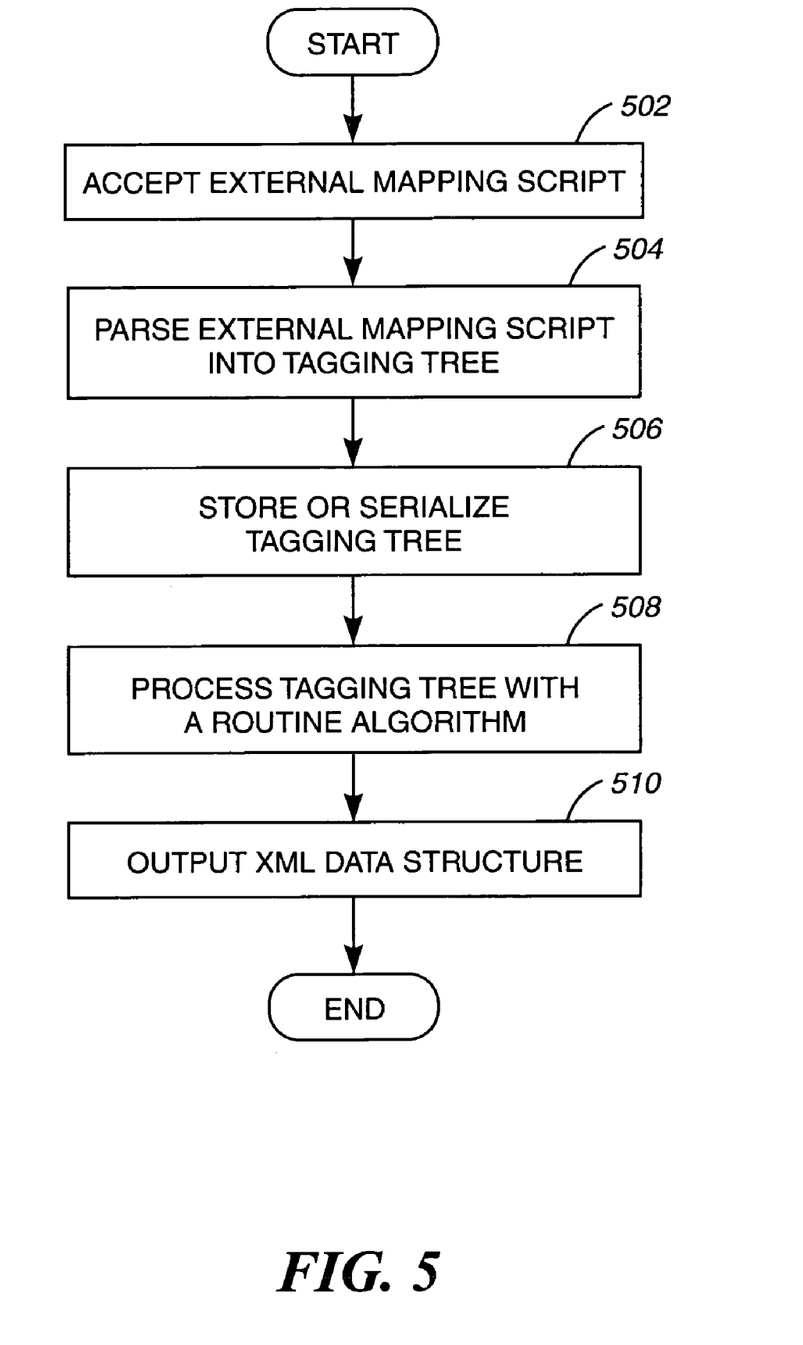
FIG. 5 illustrates a relational to hierarchical data transformation processing diagram, in accordance with an exemplary embodiment of the present invention.

A relational to hierarchical data transformation processing diagram 500 as is performed by an exemplary embodiment of the present invention is illustrated in FIG. 5. This exemplary processing begins by accepting, at step 502, an external mapping script. Exemplary external mapping scripts include the exemplary DTDSA mapping script 300 and the exemplary XRT mapping script 400. The accepted external mapping script is then parsed, at step 504, into a tagging tree. Parsing of the external mapping script is described in further detail below. As an alternative to generating tagging trees by parsing external scripts, some embodiments of the present invention allow tagging tree specifications to be generated by other means, such as by specific application programs or by manual construction.

The created tagging tree, which is created by either parsing of an external mapping script, programmatically, or otherwise, is either stored in memory or serialized, at step 506, into a persistent repository, such as file system or database. This storage or serialization allows for more efficient subsequent reuse. The tagging tree is then processed, at step 508, with a runtime algorithm in order to create a hierarchical data structure, which is an XML data structure in the exemplary embodiment. Processing of the tagging tree is described in further detail below. The processing then outputs, at step 510, the produced XML data structure. The processing then terminates.

Figure 6:
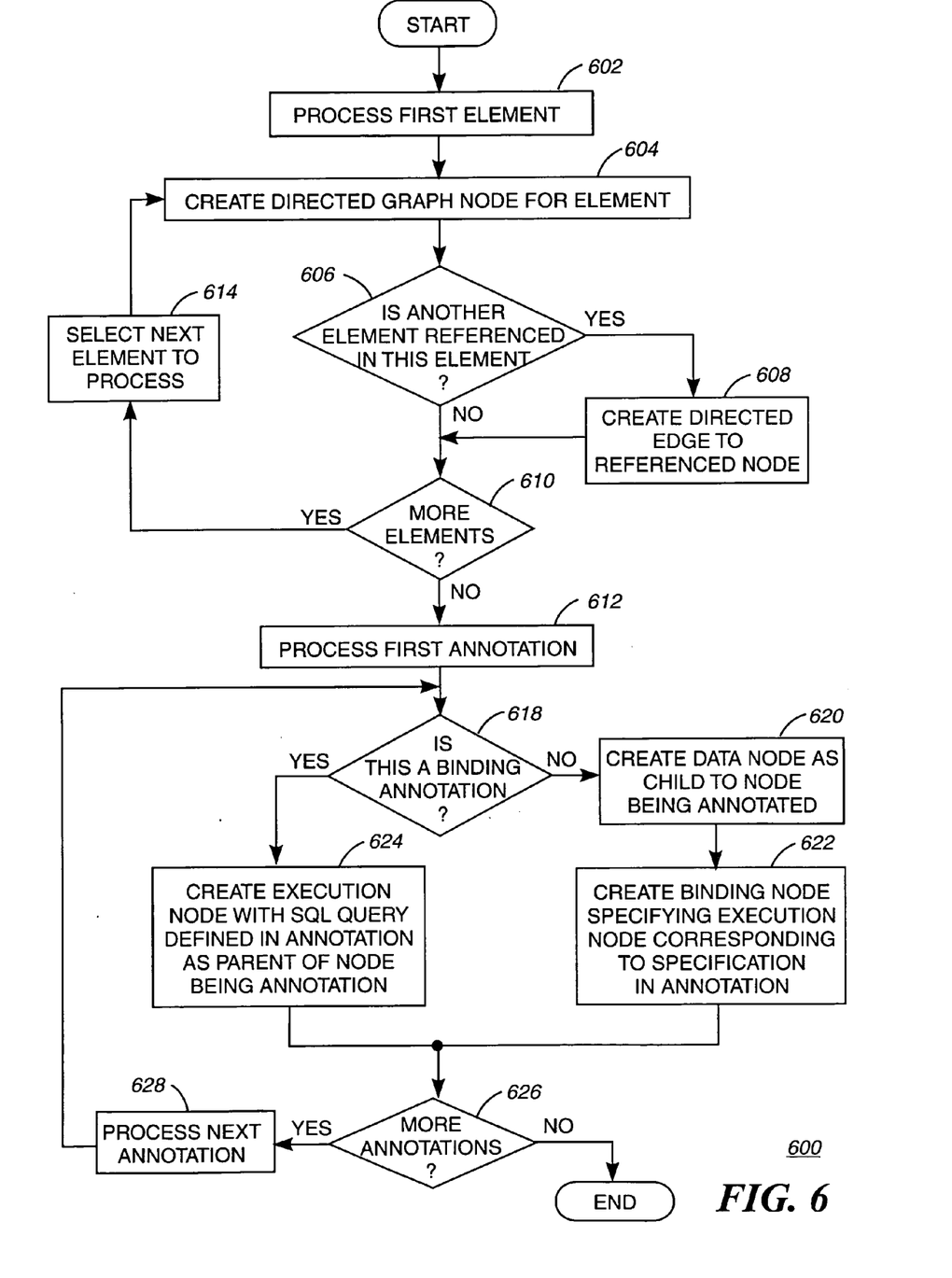
FIG. 6 illustrates a parse external mapping script processing flow diagram in accordance with an exemplary embodiment of the present invention.

A parse external mapping script processing flow diagram 600 as is performed by an exemplary embodiment of the present invention, is illustrated in FIG. 6. The exemplary parse external mapping script processing flow diagram 600 is an implementation of the parses external mapping script into tagging tree process 504, described above. This processing flow is a tagging tree generator that creates a tagging tree, which is a directed graph in the exemplary embodiment.

The parse external mapping script processing flow diagram 600 begins by selecting, at step 602, to process the first element of the external mapping script. The processing then creates, at step 604, a directed graph node for the element being processed. The processing then determines, at step 606, if the element being processed references another element within the external mapping script. If it is determined that another element is referenced in the element currently being processed, the processing creates, at step 608, a directed edge from the node being created to the node that corresponds to the other element being referenced in this element.

The processing next determines, at step 610, if there are more elements to process. If there are more elements to process, the processing then selects, at step 614, the next element to process. The processing then creates, at step 604, a directed graph node for the currently processed element and continues processing as described above.

If there are no further elements to be processed, the processing selects, at step 612, the first annotation to process. The processing then determines, at step 618, if the currently processed annotation is a binding annotation. If this is not a binding annotation, it is presumed that it is a value annotation. Binding and value annotations are described in detail above. If the currently processed annotation is determined to be a binding annotation, the annotation has the form "var:=d.sql" with values specifically defined by the currently processed annotation. The processing then creates, at step 624, an execution node that contains the SQL statement, "sql," as specified by the currently processed annotation, and the created execution node is inserted as the parent node of the node that corresponds to the element that is annotated by the currently processed annotation.

If the currently processed node is not determined to be a binding node, the processing presumes that this is a value annotation. Value annotations have the form "var.col" with values specifically defined by the currently processed annotation. The processing advances to creating, at step 620, a data node. This data node is attached as a child of the node that corresponds to the element that is annotated by the currently processed annotation. The processing also creates, at step 622, a binding node. This binding node is attached to the just created data node and specifies the execution node that corresponds to the "var" and the position of the column "col" in the result produced by the of the SQL query of this specified execution node.

After processing either a binding annotation or a value annotation, the processing determines, at step 626, if there are further annotations to process. If there are further annotations to process, the processing selects, at step 628, the next annotation to process. The processing then proceeds by determining, at step 618, if this is a binding annotation and continues processing as is described above. If there are no more annotations, the processing terminates.

Figure 7:
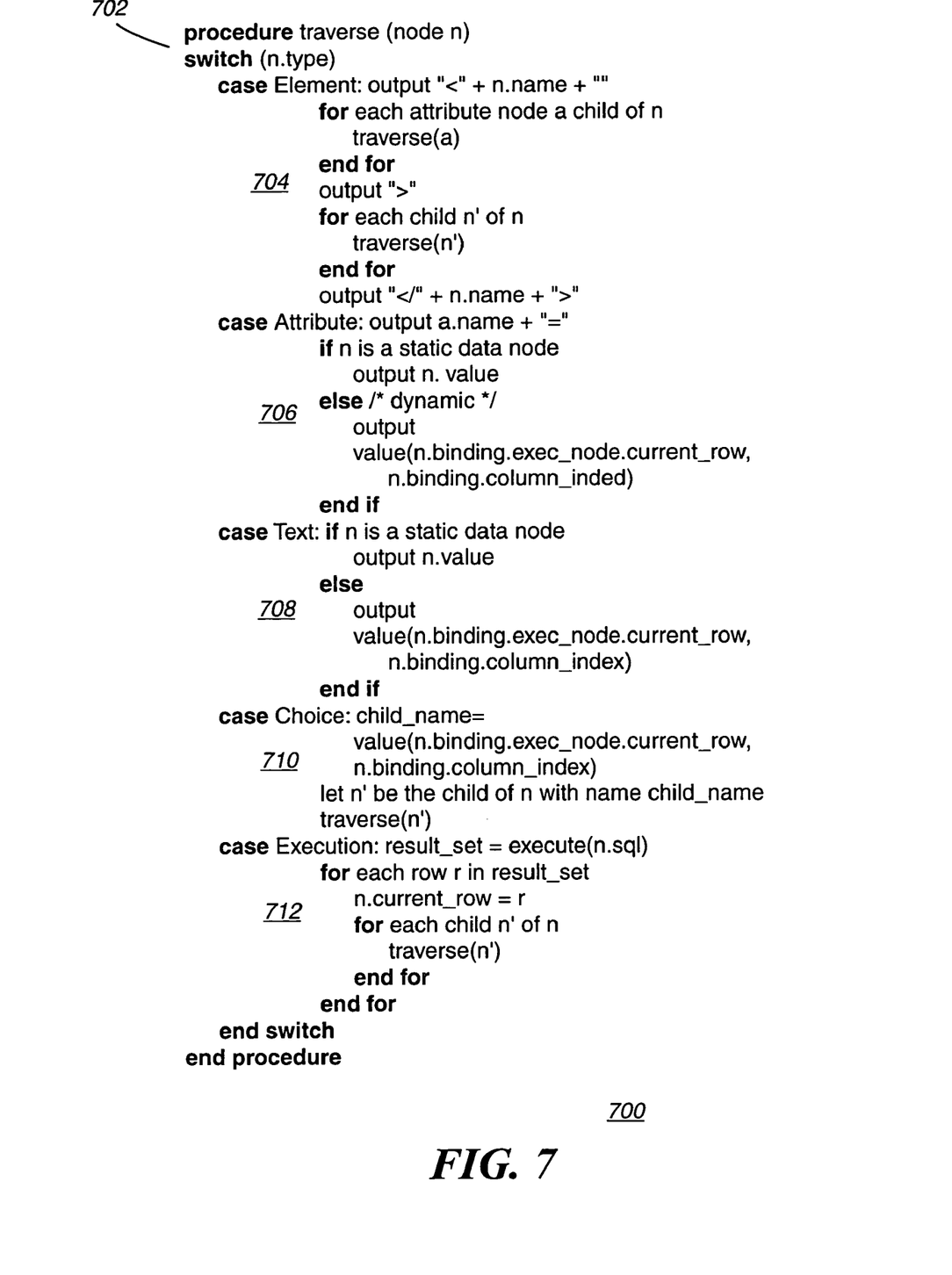
FIG. 7 illustrates a runtime algorithm according to an exemplary embodiment of the present invention.

A runtime algorithm 700, as is utilized by an exemplary embodiment of the present invention, is illustrated in FIG. 7. The runtime algorithm 700 operates by traversing the tagging tree starting from the root node with a depth first tree walk. The traverse procedure is a recursive procedure that processes each node according to its type and then calls itself for each child of the current node.

The exemplary runtime algorithm processes tagging trees and generates an XML object that contains specified data stored in one or more relational databases. In processing a tagging tree, the exemplary runtime algorithm processes each node according to the type the node. Upon encountering an execution node, the algorithm creates a dataset corresponding to the encountered execution node by executing the SQL query specified by that execution node. The specified parameterized SQL query is executed by binding the data from datasets produced by queries specified in ancestor execution nodes in order to create a new resulting dataset. These datasets are structured as a set of tuples. Each tuple within this set contains the same number of columns. Each column of a particular dataset has a name and data type. The data in the column is used either in a binding node or as the output to an XML file.

The runtime algorithm 700 of the exemplary embodiment consists of a single procedure named "traverse." This procedure is called for each node of the tagging tree being processed. The processing performed by this function varies depending upon the type of node being processed. The type of node being processed is determined by the "switch" statement 702. There are five types of nodes for which processing is defined by this runtime algorithm 700. These node types are described above. The processing illustrated for the runtime algorithm of the exemplary embodiment includes element node processing 704, attribute processing 706, text node processing 708, choice node processing 710 and execution node processing 712.

Element node processing 704 begins by generating the fixed prefix of a begin tag containing the element's name (e.g., "<po"). The children attribute nodes (if any) are then processed and their values are appended to the just generated begin tag. The begin tag is then completed by appending a ">" character. Subsequently, all of the children nodes are processed. This recursively invokes the processing of all the descendant nodes of the current element node and results in the production of an XML fragment that corresponds to the content of the current element node, including elements, attributes and text. The element node processing 704 finishes by generating an end tag containing the element name (e.g., "</po>").

Attribute node processing 706 begins by producing the name of the attribute output followed by an "=" character as an output. The attribute node processing 706 then outputs, if the attribute node is a static data node, the node's static value. If the attribute node is a dynamic data node, the value of the bound column in the current row of the result set associated with the data node is produced as an output.

Text node processing 708 is similar to the attribute node processing except that only the value (static or dynamic) is output.

Choice node processing 710 examines the value of the bound column in the current row of the result set associated with this node and a child element node whose name matches this value is chosen as the only child node that is processed.

Execution node processing 712 executes, the SQL statement that is associated with this execution node. This statement is executed by the DBMS (with all the parameters, if any, replaced with their current values). The execution node processing 712 then processes each produced row in the result set in a loop. The processing of this loop binds a current row to the row being processed and all the children nodes of the current execution node are processed, in sequence.

The runtime algorithm 700 illustrated above directly produces an XML formatted document. As an alternative to directly producing an XML data structure, such as the XML compliant document illustrated above, some embodiments of the present invention generate events for a Simple API for XML (SAX) that are provided to subsequent processing to create XML formatted output. Such embodiments perform similar processing as describe for the creation of an XML document, but replace statements that output data to an XML file with calls to the SAX interface.

Figure 8:
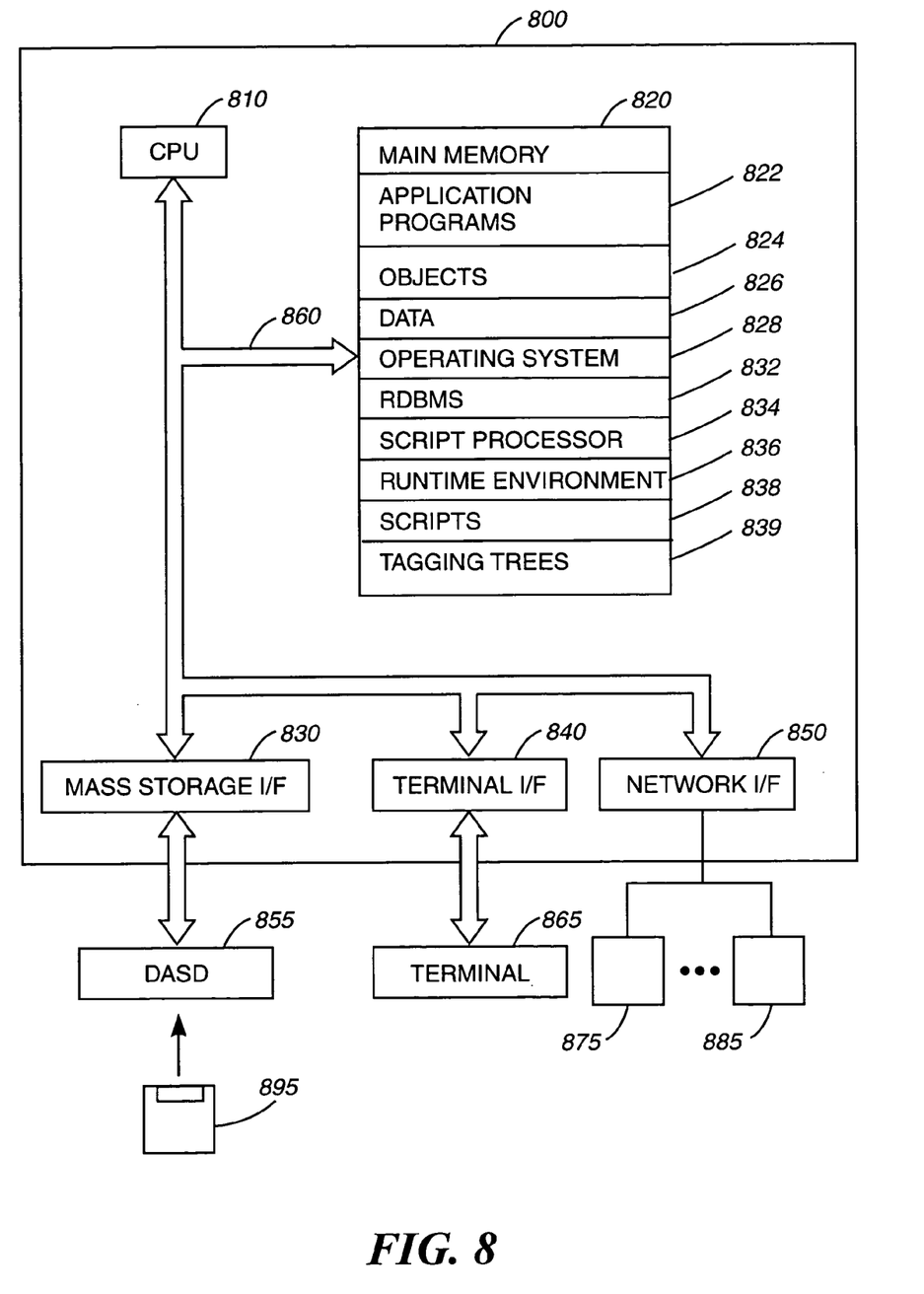
FIG. 8 is a block diagram of a computer system, according to an exemplary embodiment of the present invention.

A block diagram depicting a computer system 800, which is a processing circuit as used by an exemplary embodiment of the present invention is illustrated in FIG. 8. Processing circuits as understood in this specification include a broad range of processors, including any variety of processing circuit or computer system that is located at a single location, or distributed over several identifiable processors. These several processors are further able to be collocated or physically dispersed within a local area or a geographically widespread area. Any suitably configured processing system is also able to be used by embodiments of the present invention. The computer system 800 has a processor 810 that is connected to a main memory 820, mass storage interface 830, terminal interface 840 and network interface 850. A system bus 860 interconnects these system components. Mass storage interface 830 is used to connect mass storage devices, such as DASD device 855, to the computer system 800. One specific type of DASD device is a floppy disk drive, which may be used to store data to and read data from a floppy diskette 895.

Main Memory 820 contains application programs 822, objects 824, data 826 and an operating system image 828. Although illustrated as concurrently resident in main memory 820, it is clear that the applications programs 822, objects 824, data 826 and operating system 828 are not required to be completely resident in the main memory 820 at all times or even at the same time. Computer system 800 utilizes conventional virtual addressing mechanisms to allow programs to behave as if they have access to a large, single storage entity, referred to herein as a computer system memory, instead of access to multiple, smaller storage entities such as main memory 820 and DASD device 855. Note that the term "computer system memory" is used herein to generically refer to the entire virtual memory of computer system 800.

Operating system 828 is a suitable multitasking operating system. Operating system 828 includes a DASD management user interface program to manage access through the mass storage interface 830. Embodiments of the present invention utilize architectures, such as an object oriented framework mechanism, that allows instructions of the components of operating system 828 to be executed on any processor within computer system 800.

Although only one CPU 802 is illustrated for computer 802, computer systems with multiple CPUs can be used equally effectively. Embodiments of the present invention incorporate interfaces that each include separate, fully programmed microprocessors that are used to off-load processing from the CPU 802. Terminal interface 808 is used to directly connect one or more terminals 818 to computer system 800. These terminals 818, which are able to be non-intelligent or fully programmable workstations, are used to allow system administrators and users to communicate with computer system 800.

Network interface 850 is used to connect other computer systems or group members, e.g., Station A 875 and Station B 885, to computer system 800. The present invention works with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. floppy disk 895, CD ROM, or other form of recordable media, or via any type of electronic transmission mechanism.

Embodiments of the present invention include a Relational DataBase Management System (RDBMS) 832. RDBMS 832 is a suitable relational database manager, such as relational database managers that process versions of the Structure Query Language (SQL). A script processor 834 is also included within the exemplary computer system to parse external mapping scripts and produce tagging trees, as described above. A runtime environment 836 is included to process the tagging trees, as is also described above. Script storage 838 is also provided to allow scripts to be stored for processing by the script processor 834. A tagging tree storage 839 is further provided to store tagging trees that were generated by the script parser for submission to the runtime environment 836.

The advantages of using exemplary embodiments of the present invention include: Firstly, internal mapping is independent of external script notations used to define the required transformation. This allows support of different mapping scripts, such as DTDSA (DTD with Source Annotation), XRT (XML and Relational Database Transformation annotation) and DAD (Document Access Definition, script used by IBM DB2 XML Extender). Additional mapping scripts can also be supported without changing the internal execution process. Secondly, the structure of the mapping is organized as a tagging tree that contains both the XML hierarchical structure information as well as the query information to access different data sources (e.g. databases). By combining the data presentation and data content into one tagging tree, we are able to combine the data retrieval and data output transformation into a single step. Executing this single step provides execution performance advantages. Thirdly, the tagging tree represents at structure level the mapping from a relational database to a hierarchical data. This mapping can therefore be used as template to support multiple transformations. The tagging trees can further be stored into a permanent repository such as a database or a file system to facilitate reuse. Fourthly, the output of the transformation process can be either a serialized representation of the hierarchical data or the output can be pipelined for subsequent processing. An example of such pipelining includes representing the output as a sequence of SAX (Simple API for XML) events that can be used as an input to a SAX compliant process for further XML processing. Fifthly, the procedure efficiently uses computer memory storage because all of the created XML data elements in the exemplary embodiment are transient.

Non-Limiting Software and Hardware Examples

Embodiments of the invention can be implemented as a program product for use with a computer system such as, for example, the computer system shown in FIG. 8 and described herein. The program(s) of the program product defines functions of the embodiments (including the methods described herein) and can be contained on a variety of signal-bearing medium. Illustrative signal-bearing medium include, but are not limited to: (i) information permanently stored on non-writable storage medium (e.g., read-only memory devices within a computer such as CD-ROM disk readable by a CD-ROM drive); (ii) alterable information stored on writable storage medium (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It is also clear that given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.) It should be appreciated that the invention is not limited to the specific organization and allocation or program functionality described herein.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Each computer system may include, inter alia, one or more computers and at least a signal bearing medium allowing a computer to read data, instructions, messages or message packets, and other signal bearing information from the signal bearing medium. The signal bearing medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the signal bearing medium may comprise signal bearing information in a transitory state medium such as a network link and/or a network interface, including a wired network or a wireless network, that allow a computer to read such signal bearing information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for defining data transfer from a database into a hierarchical structure, the method comprising:
   generating a tagging tree that corresponds to a mapping between a relational database and a hierarchical data structure, the tagging tree comprising a plurality of nodes each having a node type selected from a group of node types comprising an execution node type, a data node type, and an element node type wherein:
   nodes having the execution node type comprise a parameterized SQL command,
   nodes having the data node type are positioned in the hierarchical data structure as children to at least one node having the execution node type and each node having the data node type representing a respective data element retrieved by execution of the parameterized SQL command contained within a parent node having the execution node type, and
   nodes having the element node type are positioned in the hierarchical data structure as parents of at least one node having the data node type and represent a hierarchical data element tag for a respective element in the hierarchical data structure containing the respective data element represented by the child node having the data node type;
   traversing at least one node of the tagging tree;
   retrieving, in response to traversing an execution node having the execution node type, a data object from the at least one relational database according to a respective SQL command specified in the execution node;
   inserting into an output conforming to the hierarchical data structure, in response to traversing an element node having the element node type, a hierarchical data element tag corresponding to a content of the element node; and
   inserting, in response to traversing a data node having the data node type and based upon previously traversed nodes within the tagging tree, at least a portion of the data object into a position within the output conforming to the hierarchical structure, the position based upon nodes having the element node type that are parents to the data node.

2. The method of claim 1, wherein the traversing comprises a depth-first tree traversal algorithm.

3. The method of claim 1, wherein the generating comprises parsing an external mapping script, the external mapping script specifying a mapping of data between at least one relational database table and a hierarchical data structure, the external mapping script comprising at least one first line defining a respective SQL command that is associated with a respective identifying text within the mapping script and the external mapping script further comprising at least one second line, the second line being different than the first line, with a hierarchical data structure tag and an associated binding of a data element within a result set of the at least one SQL command and the hierarchical data structure tag the binding comprising the identifying text to indicate the result set.

4. The method of claim 1, wherein the traversing comprises:
   determining a respective node type for a current node, the determining the respective node type comprising reading a node identifier of the current node;
   performing, based upon the respective node type, one of the retrieving and the inserting: and
   traversing to a next node.

5. The method of claim 4, wherein the retrieving comprises:
   executing the respective SQL command over the at least one relational database to retrieve the data object; and
   storing the data object as a set of tuples in a temporary staging area, and
   wherein the inserting comprises accessing the data object stored within the set of tuples.

6. The method of claim 1, wherein the inserting is performed in accordance with a sequence of performing the traversing.

7. The method of claim 1, wherein the output comprises an XML document, wherein the group of node types further comprises an attribute node type, and wherein the tagging tree further comprises at least one node having the attribute node type, wherein the node having the attribute node type comprises an XML attribute to be published inside a corresponding XML tag within the output.

8. A data transformation processor comprising:
   a tagging tree generator that generates a tagging tree that corresponds to a mapping between a relational database and a hierarchical data structure, the tagging tree comprising a plurality of nodes each having a node type selected from a group of node type comprising an execution node type, a data node type, and an element node type wherein:
      nodes having the execution node type comprise a parameterized SQL command,
      nodes having the data node type are positioned in the hierarchical data structure as children to at least one node having the execution node type and each node having the data node type representing a respective data element retrieved by execution of the parameterized SQL command contained within a parent node having the execution node type, and
      nodes having the element node type are positioned in the hierarchical data structure as parents of at least one node having the data node type and represent a hierarchical data element tag for a respective element in the hierarchical data structure containing the respective data element represented by the child node having the data node type;
   a runtime environment that:
   traverses at least one node of the tagging tree;
   retrieves, in response to traversing an execution node having the execution node type, a data object from the at least one relational database according to a respective SQL command specified in the execution node;
   inserts into an output conforming to the hierarchical data structure, in response to traversing an element node having the element node type, a hierarchical data element tag corresponding to a content of the element node; and
   inserts, in response to traversing a data node having the data node type and based upon previously traversed nodes within the tagging tree, at least a portion of the data object into a position within the output conforming to the hierarchical structure.

9. The data transformation processor of claim 8, wherein the runtime environment traverses at least one node by using a depth-first tree traversal algorithm.

10. The data transformation processor of claim 8, wherein the tagging tree generator generates by parsing an external mapping script, the external mapping script specifying a mapping of data between at least one relational database table and a hierarchical data structure, the external mapping script comprising at least one first line defining a respective SQL command that is associated with a respective identifying text within the mapping script and the external manning script further comprising at least one second line, the second line being different than the first line, with a hierarchical data structure tag and an associated binding of a data element within a result set of the at least one SQL command and the hierarchical data structure tag, the binding comprising the identifying text to indicate the result set.

11. The data transformation processor of claim 8, wherein the runtime environment traverses by:
   determining a respective node type for a current node, the determining the respective node type comprising reading a node identifier of the current node;
   performing, based upon the respective node type, one of the retrieving and the inserting; and
   traversing to a next node.

12. The data transformation processor of claim 11, wherein the runtime environment retrieves by:
   executing the respective SQL command over the at least one relational database to retrieve the data object; and
   storing the data object as a set of tuples in a temporary staging area, and
   wherein the inserting comprises accessing the data object stored within the set of tuples.

13. The data transformation processor of claim 8, wherein the runtime environment inserts in accordance with a sequence in which the runtime environment traverses.

14. The data transformation processor of claim 8, wherein the output comprises an XML document, wherein the group of node types further comprises an attribute node type, and wherein the tagging tree further comprises at least one node having the attribute node type, wherein the node having the attribute node type comprises an XML attribute to be published inside a corresponding XML tag within the output.

15. A computer program product for defining data transfer from a database into a hierarchical structure, the computer program product comprising:
   a storage medium readable by a processing circuit and storing instructions for execution by the processing circuit for performing a method comprising:
   generating a tagging tree that corresponds to a mapping between a relational database and a hierarchical data structure, the tagging tree comprising a plurality of nodes each having a node type selected from a group of node types comprising an execution node type, a data node type, and an element node type, wherein:
      nodes having the execution node type comprise a parameterized SQL command, nodes having the data node type are positioned in the hierarchical data structure as children to at least one node having the execution node type and each node having the data node type representing a respective data element retrieved by execution of the parameterized SQL command contained within a parent node having the execution node type, and nodes having the element node type are positioned in the hierarchical data structure as parents of at least one node having the data node type and represent a hierarchical data element tag for a respective element in the hierarchical data structure containing the respective data element represented by the child node having the data node type;

traversing at least one node of the tagging tree;

retrieving, in response to traversing an execution node having the execution node type, a data object from the at least one relational database according to a respective SQL command specified in the execution node;

inserting into an output conforming to the hierarchical data structure, in response to traversing an element node having the element node type, a hierarchical data element tag corresponding to a content of the element node; and inserting, in response to traversing a data node having the data node type and based upon the previously traversed nodes within the tagging tree, at least a portion of the data object into a position within the output conforming to the hierarchical structure, the position based upon nodes having the element node type that are parents to the data node.

16. The computer readable medium of claim 15, wherein the traversing comprises a depth-first tree traversal algorithm.

17. The computer readable medium of claim 15, wherein the generating comprises parsing an external mapping script, the external mapping script specifying a mapping of data between at least one relational database table and a hierarchical data structure, the external manning script comprising at least one first line defining a respective SQL command that is associated with a respective identifying text within the mapping script and the external mapping script further comprising at least one second line, the second line being different than the first line, with a hierarchical data structure tag and an associated binding of a data element within a result set of the at least one SQL command and the hierarchical data structure tag, the binding comprising the identifying text to indicate the result set.

18. The computer readable medium of claim 15, wherein the traversing comprises:

determining a respective node type for a current node, the determining the respective node type comprising reading a node identifier of the current node;

performing, based upon the respective node type, one of the retrieving and the inserting: and traversing to a next node.

19. The computer readable medium of claim 18, wherein the retrieving comprises:

executing the respective SQL command over the at least one relational database to retrieve the data object; and storing the data object as a set of tuples in a temporary staging area, and wherein the inserting comprises accessing the data object stored within the set of tuples.

20. The computer readable medium of claim 15, wherein the inserting is performed in accordance with a sequence of performing the traversing.

* * * * *